Aug. 10, 1937. E. JACOBSON 2,089,376
INANIMATE FIGURE AND METHOD OF MAKING SAME
Filed Dec. 27, 1932   4 Sheets-Sheet 2

INVENTOR
Emanuel Jacobson
BY
ATTORNEY

Aug. 10, 1937. E. JACOBSON 2,089,376
INANIMATE FIGURE AND METHOD OF MAKING SAME
Filed Dec. 27, 1932 4 Sheets-Sheet 3

INVENTOR-
Emanuel Jacobson
BY
ATTORNEY-

Patented Aug. 10, 1937

2,089,376

UNITED STATES PATENT OFFICE 2,089,376

INANIMATE FIGURE AND METHOD OF MAKING SAME

Emanuel Jacobson, New York, N. Y.

Application December 27, 1932, Serial No. 648,865

21 Claims. (Cl. 46—135)

This invention relates to and is applicable to movable and changeable parts of various types of inanimate figures such as dolls simulating a human or animal form, animals, mannikins, window and advertising figures, artists' dummies, puppets, statuettes and the like, and to the method of making such parts.

My invention is also applicable to living heads for theatrical, motion-picture and other exhibition purposes, as for example, when it is desired to provide the face and features of any historical, known or fictitious person, character or animal.

Numerous attempts have heretofore been made to produce a figure adapted to have its facial expression and posture changed to suit the fancy or desire of the user. Such attempts have usually taken the form of more or less intricate mechanism designed to operate and move the eyes, tongues, jaws and eyelids of the head, as well as imitations of eyelashes, and the use of articulated joints for the body parts, and the like. Attempts have also been made to produce a figure of material which will feel to the touch, like flesh.

The previously known mechanisms and devices of the types mentioned have, however, failed to approximate in an inexpensive figure or doll, any wide range of variations of the facial features and postures of the limbs such as as possible in the living animal or human form.

While the art has been compelled to satisfy the demand for an approximation, in figures, of the changes in position possible in a living body, there has existed an insistent demand for a greater range of changeability, as well as for simplicity in, and low cost of production of, such figures.

My invention therefore contemplates, among other things, the provision of such a figure as substantially eliminates moving mechanical parts, such as may be inexpensively manufactured, which is simple in construction and operation, of pleasing appearance, and which may be quickly and easily manipulated by either unskilled or skilled persons such as children, or window-dressers or actors, when my invention is embodied in toys, or window display figures or the like, or in facial masks, as the case may be.

My invention further contemplates the provision of a figure which, while being inexpensive and of simple construction, is adapted for manipulation and change throughout a wide range substantially equal to the range of voluntary change inherent in an animate body.

As distinguished from my prior patent for Changeable head, No. 1,942,370 dated January 2, 1934, wherein I have illustrated the use of plastic material interposed between a rigid base and an outer cover for the purpose of permitting the user to vary, according to his fancy, the shapes of the features thus formed on an article to which my prior invention has been applied, my present invention contemplates the provision of means for supporting the plastic material, in most cases, independently of the base.

By reason of this expedient, a great variety of parts, including not only facial features but such parts as arms, legs, fingers, and the joints corresponding to those of a natural body, may be varied in size, shape and position. By using a continuous cover over material plastic enough to feel like flesh through the cover, or by making the body of the figure an integral member with plastic in the interior thereof, many of the objections to the dolls heretofore known are eliminated. For example, since the articulated joints of the prior art are eliminated, the figure embodying my invention may be washed or bathed without danger of water reaching the interior of the figure and the consequent obvious resulting disadvantages. The figure made in accordance with my invention is further, of more lifelike and natural appearance than those made in accordance with the prior art, particularly when suitable color is embodied in the material of the figure instead of being painted or otherwise coated thereon.

It will be understood that my invention may be used with or without a base and that it may be applied, if desired, to any base, whether partly or fully preformed, and whether rigid or flexible. When used in connection with a base, certain of the changeable parts may be made integral with the base, if desired, or separately secured in place. The base may be completely covered with rubber or partially covered. The base, if used, may also take a great variety of forms, all of which will appear more fully hereinafter.

The various objects of my invention will be clear from the description which follows and from the drawings, in which.

It will be noted from the above brief description of the figures that my invention is applicable not only to plastic or changeable heads, but also to complete mobile figures wherein not only the head but the arms, legs, body, and even the smaller parts such as fingers, toes, ankles and the like may be changed in position to give the figures any desired and extremely life-like attitude. It will be understood, as has been indicated, that while I have shown my invention applied to figures in simulation of the human form, it is equally applicable to figures simulating animals or creatures of any shape, as will be obvious without further explanation.

In what follows, having in mind the great number of possible combinations which may be formed employing the various parts of my invention, I intend that certain portions of the body parts, and of the head, and the functions of said portions may be interchanged in the various forms of dolls and heads, respectively, or omitted, as may be found convenient or desirable. It will also be seen that I have illustrated but a few of the great variety of forms which my invention may take, to avoid multiplicity of illustrations, and that the various possible combinations of parts will be obvious to those skilled in the art. As an example of possible combinations, I may state that the various flexible masks, covers or faces for the heads shown, including plastic material secured thereto, may be arranged over a comparatively rigid base of any size, shape or stage of completion to form my new head, it being understood that such a base may well be an old doll head, a ball, or even a living head, or any other suitable backing or portion thereof.

Regardless, however, of which of the numerous practical embodiments which my invention may take, the employment of plastic material or "plastic" is an important feature thereof. The plastic may be made of various degrees of consistency or density, plasticity, deformability, adhesiveness and resiliency or elasticity, dependent upon the results desired. For example, for use in doll heads of the "pretty" type, it is desirable that the beauty of the face be generally preserved, while provision be made for limited changes of expression. The same applies to heads preformed in the likeness of definite characters. In such cases, the plastic is made sufficiently resilient to resume gradually, in a short interval after deformation, its original shape, size and position, aided toward this end, by the inherent resiliency of the rubber mask. Not only is the plastic therefore made somewhat resilient for the purposes mentioned, but it is also made comparatively stiff, of comparatively little volume, and confined within predetermined limits to avoid such undue distortion as might completely destroy the original likeness.

In comic heads and faces, and in theatrical masks, a wider range of changeability of the features is permissible, the plastic being therefore made comparatively non-resilient, staying where put without any tendency to come back to its original form or position, the rubber mask being of such thickness and resiliency that its tendency to resume its original form is overcome. Such heads are particularly adapted for users having greater skill in modelling than the ordinary users of dolls, and afford greater possibilities of entertainment than heads of limited changeability.

Plastic designed to permit changes of position of the limb of a figure, and to maintain the limb in the position into which it is moved until the limb is again deliberately moved, should have a different degree of "stiffness." Such plastic should be bendable and dense, but tough. It should be of such consistency as to require considerable force to distort it, so that it may support the weight of a limb and to fix the limb in the position into which it is moved without danger of such deformation under its weight as to permit the limb to shift.

Various substantially non-drying gums, well known in the varnish art, may be used as the main ingredient of the plastic, or drying gums such as rubber or resins may be mixed with a non-drying solvent therefor, or with non-drying oils, fats, waxes or greases such as mineral oils or petrolatum, wool fat, paraffine, glycerine or the like. Chicle, ordinarily called "chewing gum" and gum mastic are examples of type of gum I have found suitable for the plastic. Or any of the chewing gum bases, such as shown and described in Patents Nos. 1,534,929; 1,534,930, and 1,534,931 to Henry V. Dunham, dated April 21st, 1925, or in Patents Nos. 1,855,016 and 1,855,017 to Leon W. Geller, dated April 19th, 1932, may be used.

Inert fillers, such as cork dust (for lightness), wood flour, whiting, talc, kaolin and the like, sufficient to give the desired properties to the plastic are mixed therewith, when it is desired to modify its resiliency or to make the plastic stiffer. Any non-drying oil, fat or wax may be added in the required amount to produce the desired consistency and plasticity. It is to be understood, however, that any preferably amorphous plastic, substantially unaffected by normal changes in room temperatures and retaining its plasticity over long periods may be used where plastic is required in my invention, and hence I do not intend to limit myself to any specific ingredients or proportions thereof, but intend that the term "plastic" include plastic material having the general properties stated and the equivalents thereof.

In my said prior copending application, I have described one form of plastic as made of modelling clay, such as is used by sculptors.

The clay tends to remain plastic indefinitely. In order to obtain the proper consistency, said clay may be mixed with cork dust, wood flour or any other inert fillers. Also, the plastic may be such as has been hereinbefore described, rendered less sticky by mixing in wood flour, cork dust or any inert filler. While the plastic properties are retained, the stickiness is diminished together with the elasticity of the plastic. Natural or artificial hair or other fibrous material may also be mixed with the remaining ingredients, if desired. I have found it best to use as a plastic, a soft mass resembling bread dough in its feel, appearance and consistency.

Figures 1, 2, 3, 4, 5, 24:
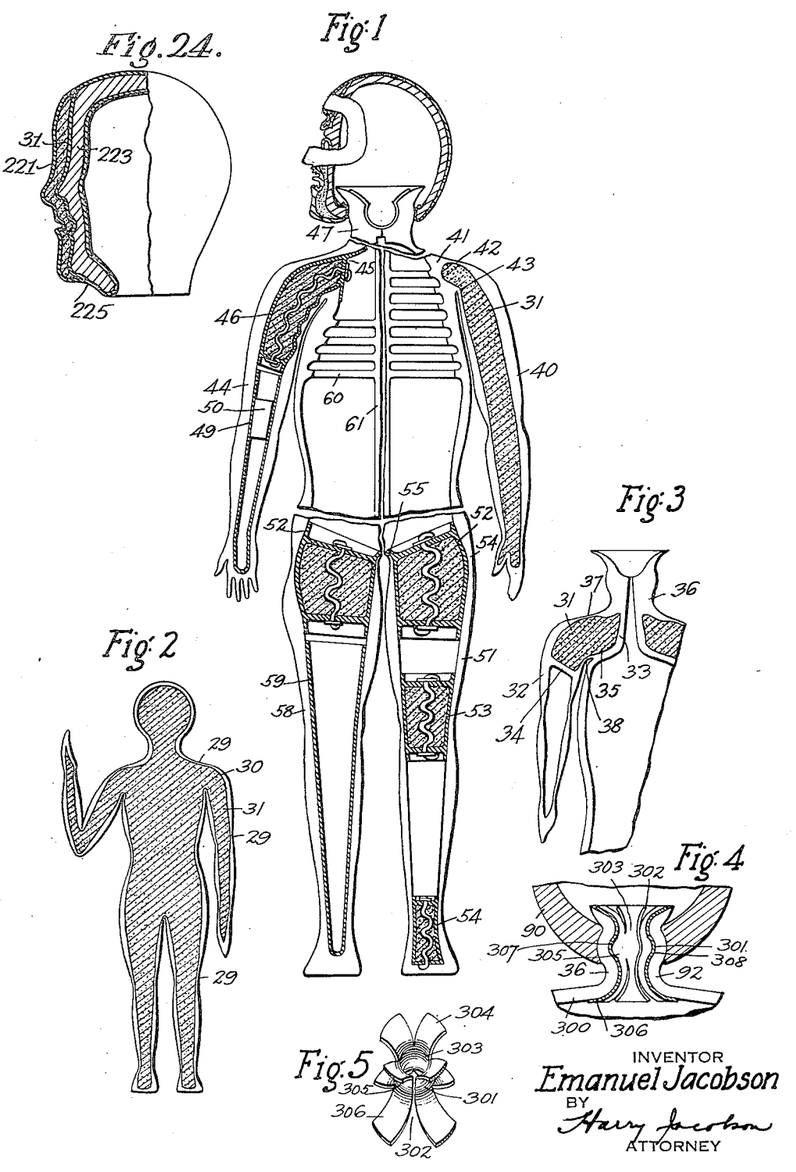
Fig. 1 is a vertical section taken through the seam thereof, of various parts of a figure, such as a doll, made in accordance with my invention, showing modifications of the arms and legs on different sides of the figure, and showing the parts in the positions normally assumed thereby.
Fig. 2 is a similar view of a doll embodying my invention in its simplest form, wherein the head, body, arms and legs are integrally joined, but wherein the parts may be shifted to new positions.
Fig. 3 is a similar section of a part of a doll body illustrating the formation of plastic pockets at the movable joints, and showing a neck portion adapted to have a movable head permanently secured thereto.
Fig. 4 is a similar fragmentary view of the neck and head parts of the doll illustrated in Fig. 3, showing the head secured to the neck.
Fig. 5 is a perspective view of the metal spring clip for attaching the head to the body, and for bracing the chest.
Fig. 24 is a vertical section of another form of the head.

In its simplest embodiment, as illustrated in Fig. 2, my invention takes the form of a hollow integral figure 30, free of joints, and filled entirely with plastic 31. This form of my invention is best adapted for small and inexpensive figures, the parts of which are to be movable. The body 30 is preferably made of suitable elastic material such as rubber and may be molded in two halves, later cemented or otherwise joined together, as is well known in the art, after the hollow interior of each half has been filled with plastic. Fig. 2 being a section through the seam between said halves, the body is not shown in section. The plastic is of sufficient consistency to overcome the elasticity and weight of the rubber body portions and the tendency of said portions to resume the shapes and positions into which they are originally molded, after they are moved therefrom.

The hollow figure containing plastic may be made in various ways. For instance, a suitable mold may be dipped into rubber latex, or sprayed therewith to form a layer of the desired thickness. The rubber container thus formed may be filled with plastic by introducing the plastic with the aid of compressed air. If desired, the entire figure with the exception of the plastic filling may thus be made of a single piece of material, or the hollow body may be made separately from the hollow head, and after both have been filled with plastic in any convenient manner, they may be cemented or vulcanized together to form the finished figure. In any case, I prefer that the body and limb parts be thinner at the points as 29, where bending is to take place than at those points which are not intended to be bent, thus insuring resistance to bending at the latter points, and minimizing the resistance at the other points 29.

In Fig. 3, I have a figure requiring less plastic, but nevertheless permitting movement of the limbs. There, a typical joint such as the shoulder is illustrated as filled with plastic 31. However, the plastic is confined not only by the outer walls 32 of the figure itself, but by additional transverse walls as 33 and 34 arranged at the outer limits of the joint. As the arm is raised or otherwise moved, the plastic in the resulting pocket 35 is bent under the force thus exerted thereon, and being comparatively stiff, remains in its bent position to support the arm against the tendency of the rubber walls to resume their initial positions and against the weight of the arm. The same applies to the leg joints and any of the other joints which it is desired be made movable.

While I have shown the arm and body as being hollow and empty, it will be understood that the plastic may be inserted thereinto as in Fig. 2 if desired, to make all of the parts distortable and movable. This may readily be done by making the figure in two transversely divided halves, and securing the halves together in the manner explained in connection with Fig. 2, and as is well known in the manufacture of rubber dolls.

The neck 36 of the figure is designed to have a head movably secured thereto by simple means which will be later explained in detail in connection with Figs. 4 and 5, and after the description of Fig. 6. It will be understood that in order to decrease the resistance to bending at any point desired and to minimize the tendency of the parts to come back to their initial positions, the thickness of the outer wall 32 may be lessened considerably at such points as 37 and 38, and corresponding points.

Referring now to Fig. 1, I have there shown a series of doll parts assembled in their operative relation, it being understood that the figure is intended to be symmetrical about both sides of the center line in the finished doll, and that the variations between the right and left hand sides are so illustrated for the purpose of reducing the number of drawings. Referring now to the arm 40 illustrated at the right hand side of the figure, said arm is made hollow similarly to that shown in Fig. 2, but at the shoulder end, the wall 41 closes the upper end of the arm to confine the plastic 31 therein. It will be noted that at the point 42 of the outer shoulder wall, and at the arm pit 43, the thickness of the walls are quite substantially reduced to induce bending at the desired points 42 and 43 when the arm is lifted or otherwise moved.

The arm 44 at the left side of the figure is similarly made hollow but the interior shoulder wall 41 is omitted, so that the interior of the body communicates with the interior of the arm as at the opening 45. This I do to permit the insertion into the shoulder and into part of the arm of the preformed shoulder joint 46, which is adapted to be made separately and then inserted into place. Said shoulder joint is shown in detail in Fig. 25, and hence need not at this time be fully described. Suffice it to say that the joint is inserted into its proper position in the arm 44 after the remaining material below said arm is properly lined or filled with plastic or with rigid members, as will now be described.

If the body is made of a single integral piece, it will be noted that the neck 47 thereof is split by not cementing the next halves together where the seam would come. This permits the spreading of both halves of the neck apart to provide access to the interior of the body of the figure. The arm 44 may be then lined with any suitable stiffening material 49 such as rubberized fabric, stiffened fabric, stiff burlap or the like to stiffen the lower part of the arm and forearm in which no plastic is inserted. A rigid member as 50 may, if desired, also be inserted at about the elbow of the arm to insure that the arm will not bend, should it be desired to make the arm non-deformable or non-bendable.

In the case where the body is made in two halves later cemented together, the stiffening lining may be molded with each half and cemented together when the halves are secured, the shoulder joint 46 and the stiffening member 50 being inserted in place before the halves are united. Other methods of securing the parts 46, 49 and 50 being obvious to those skilled in the art, they need not be further described nor illustrated. It will be understood, however, that that part of the arm below the shoulder joint 46 may be filled with plastic if desired, or that an elbow joint may be substituted for the rigid member 50 and that a wrist joint may be inserted at the proper place if desired in the manner which will be described in connection with the general form of bendable joint illustrated in Fig. 27, and shown in connection with the right leg 51 of Fig. 1. In said right leg, I have shown a hip joint 52 similar to the shoulder joint 46 and similarly secured in place. I have also shown a knee joint 53 and an ankle joint 54 similar in construction to said shoulder and hip joints.

It will be seen that in accordance with the principles of my invention hereinbefore described, the outer wall of the leg is made comparatively thin at the joints as 54 and 55, where the leg is intended to bend. Similarly, the outer walls at the joints of the knee are also made comparatively thin for the same purpose, and the ankle walls may similarly be thinned at the point where bending is to take place.

Should it be desired that the leg be not bendable at the knee and ankle as for example, in the left leg 58, then only the hip joint 52 is provided and the remainder of the interior wall of the leg is provided with the stiffening lining 59, together, if desired, but not necessarily, with stiffening members such as 50 hereinbefore described in connection with the arm 44.

At the chest portion of the body, suitable ribs as 60 integral with the body and joined to an elongated rib as 61 simulating a back bone, may be molded or otherwise formed on both halves of the inner surface of the figure so as not only to stiffen the chest portion of the doll but also, to simulate the feel through the cover or outer wall, of natural ribs.

Referring now to Figs. 4, 5 and 25 to 28 inclusive, I have there shown various typical joints which may be separately formed and inserted in the proper place in the hollow doll to retain the head and the various limbs and parts thereof in the new positions into which they are set.

Figures 25, 26, 27, 28, 29, 30:
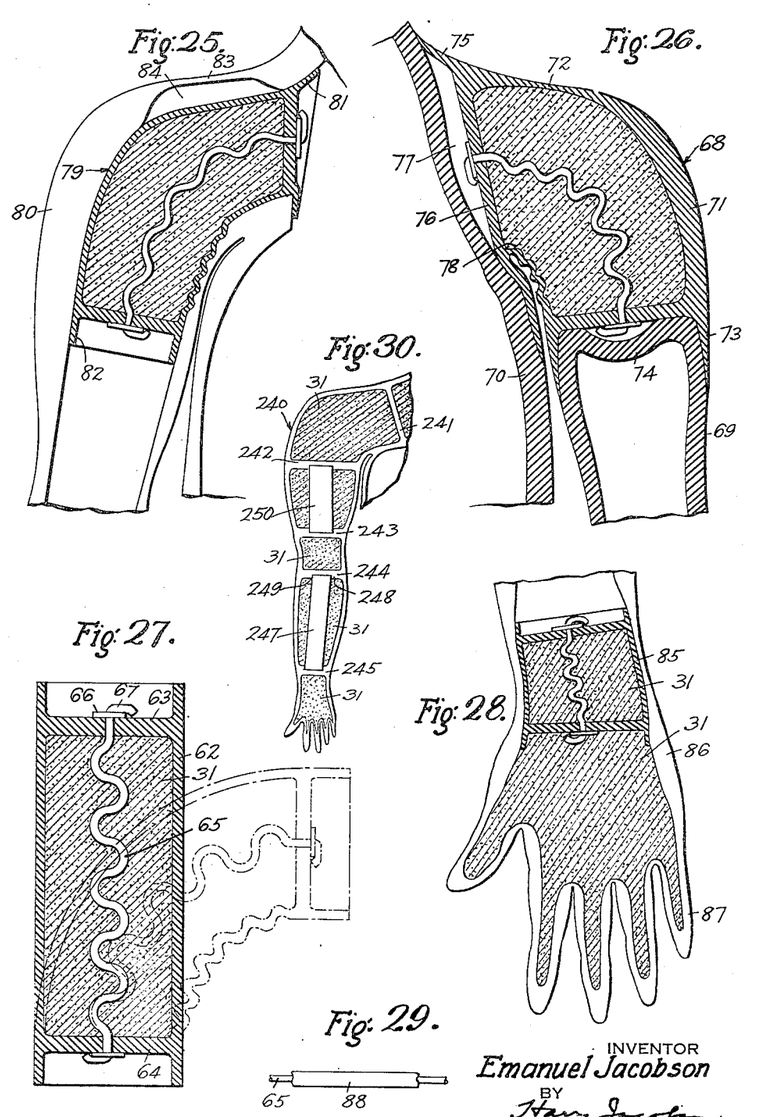
Fig. 25 is a vertical section of a typical plastic body joint such as the shoulder joint shown at the left of Fig. 1, whereby the arm may be moved into any position to remain in the position into which it is thus moved.
Fig. 26 is a similar view of a modified form of the shoulder joint wherein the shoulder portion of the figure is formed by the joint, and serves to secure the arm to the body.
Fig. 27 is a similar view of a typical joint element, which may be secured at any body portion or any limb intended to be mobile, showing in dotted lines, the position assumed by the joint when the position thereof is changed.
Fig. 28 is a vertical section of a hand to which my new plastic joint may be applied, showing also, the construction of the fingers so that the positions of the fingers may be changed as desired.
Fig. 29 is a fragmentary elevation of the wire which may, if desired, be used in connection with my new mobile joint showing the wire covered with flexible material to provide a large area of bond or contact with the plastic material.
Fig. 30 is a vertical section of a modified form of a body part, in this case, the arm and shoulder, showing the body part provided with a plastic layer inside of the flexible cover, so that the feel thereof simulates the feel of flesh.

As illustrated in Fig. 27, the joint consists of a tubular flexible member 62 made preferably of rubber, fabric, or the like, and provided with preferably integral end walls 63 and 64 confining the plastic 31 therebetween. The quantity and consistency of the plastic 31 is such as to permit the bending of the member 62 into any desired position, such as is shown by the dotted lines of Fig. 27, and to overcome the natural tendency of the flexible member 62, if resilient, to resume its initial position. It will be understood that on the bending of the member 62 into arcuate form, the outermost part thereof tends to stretch while the innermost part thereof is under compressive force tending, under certain conditions, to wrinkle. It will be understood, however, that the member 62 may be preformed initially to substantially the shape which it assumes in its normal position so that no stress is normally put thereon, and so that the stretching of one part and the compression of other parts is reduced to a minimum.

It will further be understood that on the bending of the member 62, the plastic 31 is bent therewith. Said plastic being of such consistency as to retain the position into which it is thus moved, and also having sufficient adhesive properties to adhere to the inner walls of the member 62, the plastic is moved with the member and nevertheless fills all voids therein, moving to fill up any enlargements of the space within the member under the pressure put thereon during the bending operation.

Should it be desired to reinforce the plastic and to take up some of the stress put thereon during the bending operation, a suitable sinuous wire as 65 may be inserted in the plastic and secured to the walls 63 and 64. The wire 65 is preferably passed through a suitable washer 66 and bent over at each end as at 67 to secure it in place. Said wire is preferably made of non-resilient metal such as lead, tin or the like, or alloys thereof such as are well known and hence need not be further described. Since metallic wire offers greater resistance to bending than does the plastic, it aids the plastic to maintain the limb in the position into which it is set.

Since, further, the joint which I have just described may be separately manufactured, it will be understood that it has general application to various types of figures irrespective of the material of which said figures are made.

For example, I have illustrated in Fig. 26, the use of the joint designated generally by the numeral 68 to connect an arm 69 to a body part 70. Either the arm or the body or both may be made of rigid or flexible or resilient material as may be found convenient or desirable. In any case, a flexible joint is provided, permitting movement of the arm relatively to the body into substantially any desired position and through a wide range of movement. In this case, the wall portion 71 at the round of the shoulder is considerably thickened to insure that no bending takes place at that point. The wall 71 is thinned, however, as at 72, to induce bending at the point 72. The tubular extension 73 of the wall 71 is adapted to receive the upper end 74 of the arm and to be cemented thereto. Similarly, the extension 75 is adapted to be cemented to the body 70 so as to give the appearance of a continuous surface of the proper shape, being suitably skived or feathered at its periphery for that purpose.

It will be noted that between the body 70 and the end wall 76 of the joint, a space as 77 is provided, into which the end wall may move when necessary, under the pressure of the plastic 31 within the joint as the joint is bent. It will further be noted that at the point 78, the inner wall of the joint is thinned so that bending will occur on a plane passing through the points 72 and 78. When the arm 69 is raised through a large angle approximating 180°, the upper wall 72 may become slightly wrinkled or dimpled, similarly to the skin of a living person, while the wall portion adjacent the point 78 may be slightly stretched if made of suitable material such as rubber.

Referring now to Fig. 25, I have there shown a shoulder joint 79 similar to the shoulder joint 46 illustrated in Fig. 1, and arranged in the interior of the hollow shoulder 80. This joint differs from that illustrated in Fig. 26 in that it is concealed within the interior of the shoulder 80, while the joint 68 forms part of the exposed shoulder of the figure and joins the body to the arm. In the modification illustrated in Fig. 25, the body is preferably made of flexible and resilient material such as rubber or the equivalent thereof. The tubular extension 81 is suitably secured as by cement to the interior surrounding walls of the body, as is the opposed extension 82. The shoulder is illustrated as thinned at 83 to induce bending thereat, while a space as 84 is provided between the thin portion of the shoulder and the wall of the joint to provide additional space wherein part of the joint may enter under the pressure of the plastic 31 therein.

Similarly, the typical joint 85 illustrated in Fig. 28 may be used in connection with the wrist of the hand 86. As illustrated, the hand as well as the fingers 87 thereof are made hollow for the reception of the joint. Additional plastic 31 fills up the hollows in the fingers and in the hand, to permit setting the fingers in any desired position. It will be seen that by reason of the provision of the joint 85 and the plastic filled fingers, the hand of a figure to which my invention is applied may be moved into any desired position to simulate the various positions assumed by the human hand and if desired, to grip articles thereby.

As shown in Fig. 29, the non-resilient wire 65 may, if desired, be covered with suitable flexible material 88 to form a reinforcing cover for the wire, and to provide a greater area to bond and contact with the plastic 31. The cover 88 furthermore serves to hold the wire together should it break for any reason.

Referring to Fig. 30, the rubber arm 240 is made hollow, but is provided with a series of spaced partitions as 241, 242, 243, 244, and 245, preferably formed integrally with the remainder of the arm. Said partitions are preferably arranged in pairs at each of the movable joints of the arm. At the wrist, however, only one partition 245 is shown by reason of the inconsiderable length of the joint there provided. The hand is filled with plastic 31 up to the wall 245 and being below the wall 245, may be readily manipulated.

Between the walls 241 and 242 forming the shoulder joint, is inserted the plastic material 31 whereby the entire arm may be swung into any desired position to distort the plastic in the pocket between said walls 241 and 242. Similarly, the elbow joint may be manipulated and changed in position owing to the arrangement of the plastic 31 between the walls 243 and 244.

To prevent the arm from bending or becoming otherwise distorted in the forearm and in the upper arm, a rigid member as 247 surrounded with plastic is arranged between the walls 244 and 245. Said walls are each provided with an annular rim 248 forming a socket 249 for the reception of the ends of said rigid member. Similarly, the rigid member 250 is inserted between the walls 242 and 243 and similarly held in the sockets formed thereon. It will be seen that in this form of my invention, the arm may be manipulated to assume any position corresponding to the natural position of the arm of a living person and that the hand and fingers may be similarly manipulated.

My invention, as shown in Figs. 6 to 24 inclusive, takes the form of a face mask, head or part thereof, but like the other embodiments, includes plastic to make the facial features changeable in expression, shape and size. The head covering is made in the form of a soft, elastic, rubber casing, having a mask provided with preformed features, and in certain cases, with a rubber inner wall spaced as desired from the mask, plastic being arranged between the mask and the inner wall.

The mask may be made in the shape of an entire head if desired, with or without a neck, and may be designed for use by itself or to cover the head of a living person, or to cover any type of base of appropriate size. A great variety of combinations of base and mask are possible. Complete or partially formed features may be provided on the base, or the features may be entirely omitted from the base. The base may be made of one or more pieces of material, rigid, semi-rigid or flexible to the desired degree. The mask may be made in the form of a face only, assembled with the base, or with only a part of a base, and the completed front including the face and base portion afterwards secured to the remainder of the base. The base may, if desired, be first coated with a rubber layer and afterwards covered or partly covered with the mask, or the mask with the assembled plastic therein may be secured directly to the base. The mask may be stuffed with suitable material for use as a bust or ornamental statue. It may be permanently or removably secured to the base.

Figures 6, 7, 8, 11, 12, 13:
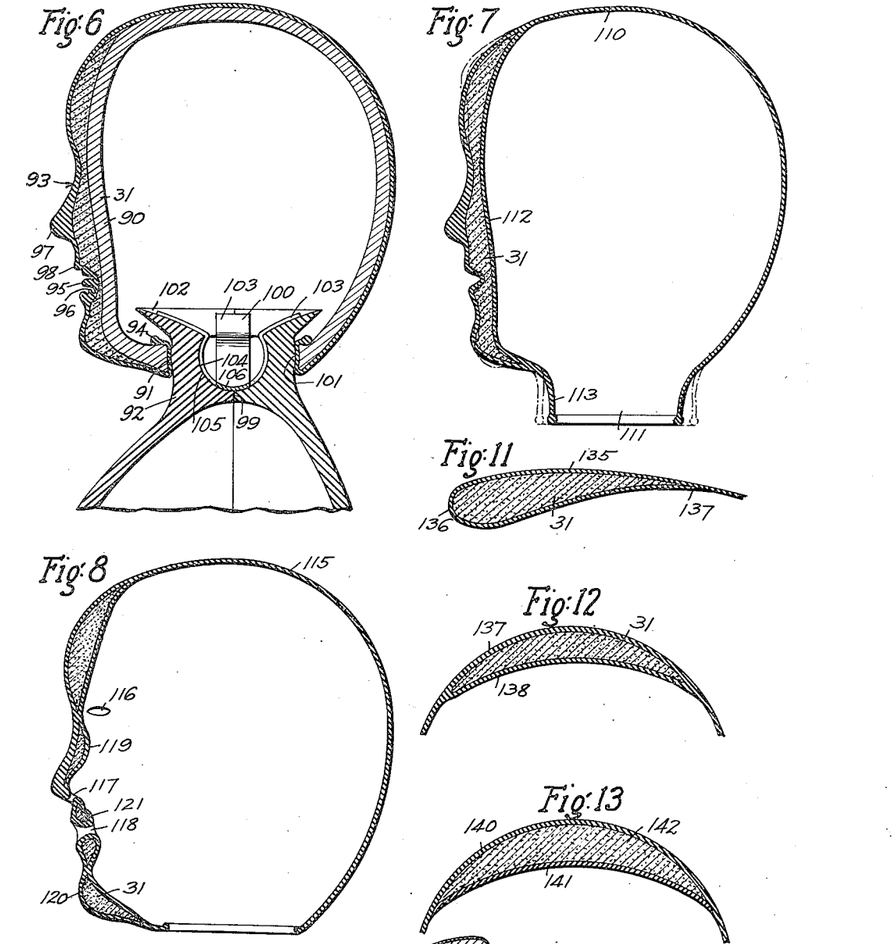
Fig. 6 is a vertical section of a head embodying my invention showing also, a modified form of the means for movably securing the head to a body.
Fig. 7 is a similar section of a self-complete head mask made in accordance with my invention, and which may be applied to any head or to any base approximately the size and general shape of the interior of the mask, if desired, and showing, in dotted lines, an example of how the form and shape of the head may be changed.
Fig. 8 is a similar view of a mask adapted to be arranged over the head of a person and provided with eye and mouth slits and nostril openings to permit the wearer to see, breathe, and talk.
Fig. 11 is a cross-section of a portion of a changeable feature, joint or the like, showing the plastic material enclosed therein.
Fig. 12 is a similar view of a modified form of the same.
Fig. 13 is a similar view of still another modified form of the same.

In Fig. 6, the base 90 is shown in the form of a hollow shell, open at its lower end 91 for the reception of a suitable neck 92 formed on the doll head. I prefer to make the base so that it is substantially rigid and resists any pressure which may be put upon the mask to change the features thereof, thereby forming a backing or stop for the plastic. The base may be made, for example, of such compositions as are generally used for doll heads such as a mixture of pulp flour and starch or casein, glue or cement. It will be understood, however, that more expensive moldable and substantially rigid materials such as fiber or bakelite, may be used if desired, and being well known, need not be described in detail.

It will also be understood that the base may be formed of metal by any well known processes as, for example, is fully described in my above-mentioned prior patent.

The mask 93 is made preferably of soft elastic rubber and in the form shown, is intended to cover the entire base 90, being secured thereto at the annular end 94 thereof, which is arranged in the interior of the base. The plastic 31 in the desired amount, is interposed between the mask 93 and the base 90. In the form now being described, I have shown a tongue 95 and teeth 96 formed integrally with the mask 93 as well as a thickened nose 97. There being plastic behind the features mentioned as well as the other features, it will be understood that the lips 98 may be manipulated to expose the tongue and teeth, if desired, as for example, when the mask is to be given a smiling expression.

It will be noted that the neck 92 is split as at 99 so that the head may be assembled to the neck and maintained in place by means, for example, of the spring clip 100. Toward this end, the neck is provided with a convex annular bead 101 adapted to fit the corresponding concavity at the opening 91 of the base.

The spring clip 100, when arranged in place, serves to spread the bead 101 into close contact with the base, and thereby permits the head to be raised and lowered to a certain extent by tilting, as well as turned about a vertical or inclined axis. The head cannot be lowered past the bead 101, nor can it be raised therepast, but can be tilted or rotated to the desired limited extent. It will be noted that the upper end 102 of the neck is flared in order to receive the upper ends 103 of the spring clip 100, to be normally of a diameter greater than that of the head opening.

Said spring clip is provided with the lower cylindrical portion 104 fitted into the spherical recess 105 of the neck and branching from the lowermost portion 106 thereof, preferably in opposite directions. It will be understood, however, that as many of the cylindrical portions 105 may be provided as is found convenient. To insert the neck into the interior of the base, the upper flared end 102 thereof is squeezed together and collapsed, it being possible to do so when the neck is made of rubber, the clip 100 being first arranged in place. Squeezing of the neck collapses not only the cylindrical portion 104 of the clip but also carries the terminal arms 103 toward each other and toward the center of the neck, thereby reducing the diameter of the neck to such an extent that it can pass through the opening of the head. After the collapsed neck and clip have been passed through said opening, the upper end of the neck is forced into the interior of the head until the concavity 91 reaches the convexity 101, at which time the spring clip is freed of pressure and expands to spread the neck into the position shown in Fig. 6 and thereby to hold the head and neck together.

In that form of my invention shown in Figs. 3, 4 and 5, I have provided a spring clip designed not only to secure the head 90 to the neck 92, but also to brace, reinforce and make rigid the chest 300 of the figure.

The central portion 301 of the clip is made hollow and of general cylindrical form but is provided with a gap as 302. Extending from the upper edge 303 of the portion 301 are the spaced spring prongs 304, while similarly extending from the lower edge 305 thereof are the tapered similar prongs 306. The portion 301 is preferably provided with a bead as 307, designed to enter a correspondingly concaved portion 308 of the neck. To secure the head to the neck, the portion 301 is squeezed together to make the bead 307 of not greater diameter than the opening in the head. The neck and the clip in their assembled relation being thus squeezed together and the prongs 304 and 306 being also squeezed together to reduce the spread thereof, the neck is inserted into the head opening and the clip released, whereupon the prongs automatically spread into the position shown in Fig. 4, to secure the parts together and to reinforce the chest of the figure.

It will be noted that the head may be rotated on the bead formed in the neck, in the manner hereinbefore described in connection with Fig. 6, but that the head cannot be removed from the neck except on the exertion of considerable force much greater than that employed in the normal use of the doll. Should, however, it be desired to arrange a different mask about the head, it is possible to so disconnect the head and the neck, remove the mask and to replace it with a different one, whereafter the neck may be re-inserted into the head and there held in the manner above described. The detachable connection is, therefore, advantageous in changing the mask of the head or in replacing the head by another.

In that form of my invention shown in Fig. 7, the mask 110 is shown in the form of a casing open at one end as 111. Features are preformed on the mask 110 in a manner which will be later described.

To hold the plastic 31 in position, an inner rubber wall as 112 is cemented to or made integral with the mask 110. As shown by the dotted lines of Fig. 7, the features of the mask may be changed as desired by pressure upon the plastic through the outer wall of the mask.

The mask 110 may be used over any base, and is adapted to be removed therefrom for the substitution of a mask having different features or facial characteristics, when desired. As has been explained, the base may take the form of a ball over which the mask 110 is arranged. Or the base may take the form of an old doll head, or any substantially rigid article of appropriate size. If desired, however, the mask may be used without any base whatsoever and may be arranged to stand on a support, or to be inflated, or to be secured to a suitable base, in which case, the neck 113 thereof may be so cemented to the remaining parts as to make a permanent and hidden joint therebetween.

In the form shown in Fig. 8, the mask 115 may be used on the head of a living person, being provided with suitable eye openings 116, nostril openings 117, and a mouth opening 118. The inner soft rubber wall 119 is cemented to the outer wall of the mask, after plastic as 31 has been arranged at the desired places. Said inner wall may be of a continuous sheet or of separated patches, as may be found convenient, and said inner wall may be made integral with the outer wall of the mask in a manner soon to be described. It need merely be said that for purposes of economy of material and lightness in weight, the plastic preferably is arranged in spaced pockets as 120 and 121 at the joints where the features are to be varied or changed. Such a mask is well adapted for use for motion picture exhibition purposes as for example, to present various fictional or historical characters without the necessity for long delays in the attachment of plastic to the face and the manipulation thereof, and the wait for the plastic to dry or harden. It will be understood that if the features of the mask are preformed to simulate the facial features and likeness of a known character, the necessity for complicated make-up is avoided and both stage and motion-picture performances may be given by actors wearing such masks. It will further be understood that if desired, the mask may be attached to a base for ornamental purposes and to simulate the heads of statues.

Figure 9:
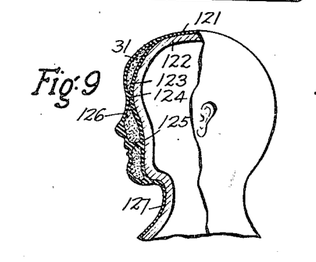
Fig. 9 is a similar view of a preformed mask with changeable features, as it appears mounted in place on a base.

In Fig. 9, I have shown the mask 121 secured to the base 122 permanently. The inner wall 123 of said mask is secured to the outer wall at spaced points as 124 and 125 to provide pockets as 126 in which the plastic 31 is arranged. In this form of my invention, the mask may be provided with a suitable neck as 127 intended to be attached to the neck and upper chest of the base to simulate a bust or the like, or to form part of a complete figure.

Figure 10:
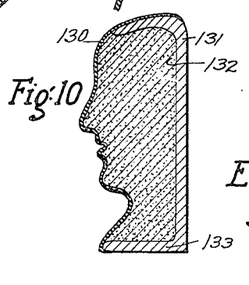
Fig. 10 is a similar view of my new mask as it appears mounted on a base to simulate a bust, while permitting variation thereof.

In Fig. 10, I have shown the mask 130 having features preformed thereon, secured to a suitable backing 131 to leave a space 132 therebetween. Said space may be filled with porous sponge rubber, hair, shreaded fiber or the like, the interstices of which are in turn filled with plastic. If the lower surface 133 of the base is made flat, such a device may be stood on a table or hung on a wall to give the appearance of a bust, while being capable of manipulation to change its expression, as has been previously pointed out.

It will be understood that the plastic pockets of a mask may be formed by means of an inner wall and an outer wall. In Fig. 11, I have shown a sheet as 135 folded as at 136 and cemented on itself at 137 with the plastic 31 held in the fold. A pocket so formed is useful at various points in the mask as for example, at the lips 121 of Fig. 8.

Another form of pocket is shown in Fig. 12, wherein the outer wall 137 and the inner wall 138 are spaced apart with the plastic 31 therebetween, the walls being made, if desired, of sheet rubber and cemented together, or being cast or poured from latex to become integral with each other, as will be later explained in more detail.

In Fig. 13, I have shown the outer wall 140 formed of sheet rubber or rubber latex or the like, and the inner wall 141 secured thereto to form a pocket in which plastic material as 142 or sponge rubber filled with plastic material may be arranged. It will be understood that the pockets of Figs. 11, 12 and 13 are intended to form part of a mask to provide a plastic pocket independent of the base to which the mask is attached, and permitting manipulation of the features of the mask or of a body joint of a doll figure or the like.

While in Figs. 6 to 10 inclusive, I have shown substantially complete head masks designed to cover the top of the head, and in some cases, the back of the head, and/or part or all of the neck and even part of the chest, it will be understood that my invention, when applied permanently to a rigid base, may take the form of a face mask only, to leave the rear portion and/or top and side portions of the head uncovered.

This form of my invention has been shown illustrated in connection with other matter in Figs. 14 to 23 inclusive. In these figures, it is intended that the face mask be used in connection with a substantially rigid base. The base, however, may take a great variety of forms, as has been previously indicated, and as will now be explained.

Figure 14:
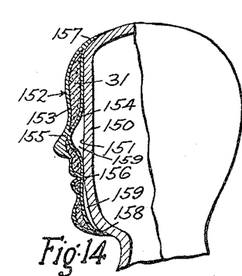
Fig. 14 is a vertical lateral section of a modified form of a head to which my invention has been applied, showing one form of the changeable face portion of the head secured to a base.

Referring to Fig. 14, the base 150 may be made of any suitable substantially rigid material such as the wood flour, starch, casein, cement and glue composition, frequently used for this purpose or of other inexpensive material such as metal, fiber, hard rubber, bakelite or the like plastic, which when hardened, is not likely to break under ordinary use or when dropped.

The front wall 151 of the base is so arranged in Fig. 14 as to be spaced a substantial distance rearwardly of the outer wall of the mask 152. Said mask, with its plastic content, is preferably preformed and then secured in any suitable manner to the base as by means of rubber cement or other well known cement or adhesive. The front wall 153 of the mask is, as has been previously indicated, preferably made of soft rubber by any suitable method such as will be hereinafter described, and has the facial features preformed thereon, certain of the features such as the nose being made comparatively thick, if desired. Thereafter, the plastic 31 is arranged at the proper points and said plastic confined in place by the shaped inner rubber wall 154.

It will be understood that the inner wall 154 is of the desired shape and tends to hold the required quantity of plastic in place and to confine the plastic in the area required. This may be done by cementing or otherwise attaching or securing the inner wall 154 to the front wall 153 at any suitable points such as the points 155 and 156, thereby giving an irregular shape and contour to said rear wall. When the mask is secured to the base as by means of its projecting flaps 157 and 158, it will be noted that empty pockets as 159 are provided between the rear wall 154 of the mask and the front wall 151 of the base, into which pockets part of the plastic and part of the wall 154 may enter during the manipulation of certain of the facial features without causing undue distortion of the remaining features. It will also be understood that the peripheral portions of the flaps 157 and 158 may be suitably skived, bevelled or feathered to make the juncture thereof with the base least noticeable.

Should it be desired to cover the back of the base 150 corresponding to the rear portion of the head with a rubber sheet, such a sheet may readily be preformed, feathered at its front edge and secured to the correspondingly feathered flaps 157 and 158 to provide a head having a complete rubber cover.

Figure 15:
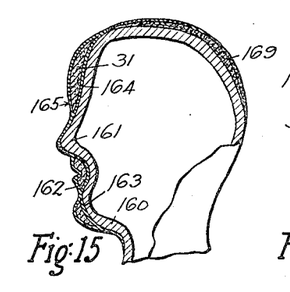
Fig. 15 is a similar view of a modified form of the same wherein partially preformed features are made on the rigid base.

Referring to Fig. 15, I have there shown the base 160 provided with partially formed features as 161. The mask 165 is provided with the outer wall 162 having preformed features of uniform or varying thickness thereon and of sufficient area to cover the desired amount of the base. As shown, the mask 165 extends sufficiently about the base to cover the top and part of the back thereof though it will be understood that if desired, the mask may cover the entire head or any suitable portion thereof including or excluding the neck. It will be understood that in order to simulate the feel to the touch of the human head, cotton, kopak or felt 169, may be arranged between said outer wall and the base whereby the outer wall is movable slightly over the base to simulate the feel of the scalp.

It will also be understood that such stuffing material 169 may be used with any of the forms of my invention previously described in connection with Figs. 11 to 13 inclusive and as will be more fully pointed out hereinafter. It need merely be said here, that the rear wall 163 is arranged in spaced relation to the front wall 162 at the desired points to form pockets 164 at the desired points of the face wherein the plastic 31 is arranged. In this form of my invention, the quantity of plastic necessary may be substantially reduced, and the head thereby made of considerably reduced weight.

Figure 16:
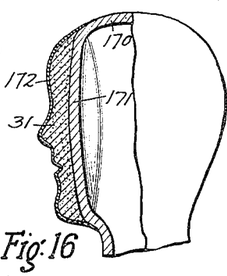
Fig. 16 is a similar view of a modified form of the same, wherein a single and comparatively large plastic pocket is provided to insure a wide range of variation and change of the features.

As shown in Fig. 16, where a wide range of changeability is desired, the base 170 may be provided with a curved front wall 171 conforming to the general contour of the face, that is, somewhat convex toward the front and toward the sides. The outer rubber mask 172 is provided with preformed features of the desired uniform or varying thicknesses and retains the plastic 31 in place directly against the front wall 171 of the base. It will be understood that the mask 172, while shown as covering the front portion and part of the top and neck of the base only, may be extended to substantially enclose the head as illustrated, for example, in Fig. 6.

Figure 17:
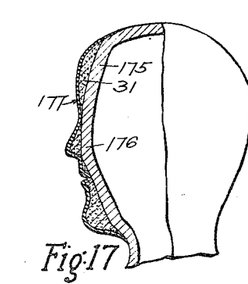
Fig. 17 is a similar view of the same, similar to Fig. 14, but showing a modified form of the front wall of the base to provide separated pockets of plastic material behind the face.

In Fig. 17, the base 175 is provided with an irregular front wall 176 shaped to contact with the mask 177 at spaced points so that pockets may be provided therebetween at the desired points, for the retention of the plastic 31 therein. In this form of my invention, it will be understood that the front wall 176 may be made of the desired shape found most convenient for manufacture, while allowing for a considerable range of changeability of the features without undue distortion.

Figures 18, 19, 21, 22, 23:
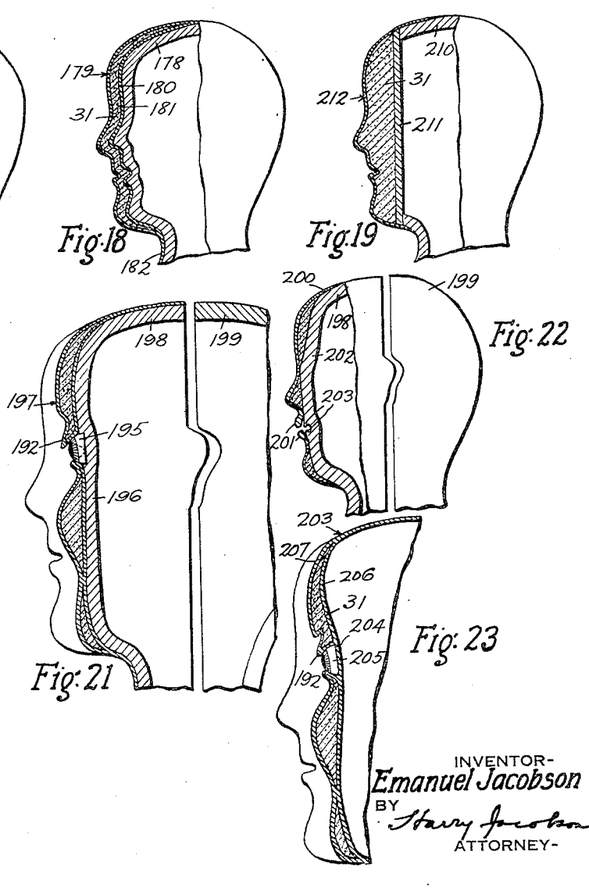
Fig. 18 is a similar view of a modified form of my invention similar to Fig. 15, but wherein the rigid base is made with entirely preformed features such as are found, for example, on the head of a doll now customarily used, whereby an old doll head even though greatly damaged, may be used as the base.
Fig. 19 is a similar view of a modified form of my invention wherein the base is made of two parts, the rear part being open at the front, and the front part being assembled with the changeable face before it is secured to the rear part.
Fig. 21 is a similar section, showing a two-piece base with the parts separated, but in position ready for assembling and showing, further, rigid eye balls of metal glass or other suitable material secured to the base.
Fig. 22 is a similar view of a modified form of the same, wherein lips are preformed on the face and are separable to expose the teeth and tongue formed on the base.
Fig. 23 is a view similar to Fig. 20, showing the eye ball, however, secured to the face or outer covering member.

Referring now to Fig. 18, I have there shown the adaptability of my invention to any base as for example, an old doll head 178. The mask 179 may cover the head completely as shown, or partially, as hereinbefore indicated. In any case, however, the inner wall 180 is secured to or made integral at its periphery with the outer wall, and arranged in spaced relation thereto to form the space 181 in which the plastic 31 is arranged. The entire mask together with the inner wall and plastic may be made in advance and arranged over the doll head 178 which, of course, may be complete and in good condition or damaged and battered to such an extent that it is otherwise unusable by itself.

The entire mask being open at its lower end, may readily be stretched over the head in approximately the correct position and retains its place on the head due to the stretching of the neck portion thereof. Said neck portion 182 is of such diameter as to be necessarily stretched in place for the purpose mentioned, and may be made thicker than the remaining portion of the mask, if desired, to retain its grip with sufficient force to take the stress put upon the mask during the manipulation of the features thereof. The resulting structure is similar to the arrangement of the mask of Fig. 7 on a suitable base, it being understood, however, that the mask 110 may be arranged over a ball or base of any shape whatsoever, as distinguished from the old doll head 178 of Fig. 18.

Figure 20:
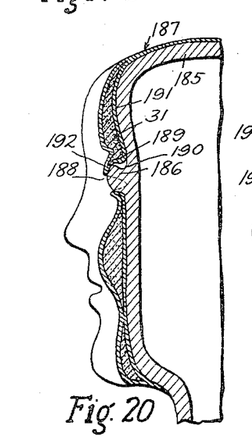
Fig. 20 is a vertical section of a modified form of my improved head, showing the arrangement of eye parts integral with the base and the use of a movable eyelid.

In Fig. 20, I have shown the base 185 formed with an integral eye ball 186. The mask 187 is open as at 188 for a sufficient distance to expose the eye ball and is provided above the opening with a fullness 189 corresponding to an eyelid. The base is preferably shaped as at 190 to provide a pocket for the reception of the plastic 31, the inner wall 191 of the mask retaining the plastic in its proper position. It will be seen that the eyelid 192 may be drawn down over the eye to elongate the fullness 189 and thereby to close the eye. Similarly, by applying inward pressure to the eyelid, said eyelid is forced back into the pocket 190 and the eye opened.

It will be understood that the eye 186 is suitably enamelled or painted to present the appearance of a natural eye. It will further be understood that the eye may be made of a separate piece of material such as glass or the like and suitably secured to the base by cement or suitable anchorage as for example, indicated in Fig. 21. It will further be understood that the eye 186, instead of being painted, may be covered with a layer of material suitably painted or otherwise colored to simulate the human eye.

As shown in Fig. 21, the eye 195 may be made of metal, glass, celluloid or other suitable material and secured to the base 196. The mask 197, however, is made similarly to the mask 187 of Fig. 20. In this form of my invention, I have shown the base made of two separate pieces 198 and 199. The mask 197, when complete, and including, if desired, the eyelid 192, is suitably secured to the front base portion 198, after which the base parts 198 and 199 are cemented or otherwise suitably secured together to form the complete head.

In Fig. 22, which is similar to Fig. 21, the mask 200 is preformed with suitable lips 201 unsecured to the base 202 and therefore free to be moved in any direction to expose or to conceal the teeth 203 which are formed on the base either integrally or in any other suitable manner. After the mask 200 has been assembled on the base portion 198, said base portion is secured to the rear base portion 199 in the manner hereinbefore explained in connection with Fig. 21.

In Fig. 23, I have shown the mask 203 provided with a recess 204 in which the eye 205 is inserted and secured. The eyelid 192 is made in the same manner as hereinbefore explained in connection with Fig. 20. In this form of my invention, the mask 203 may be secured to any base but nevertheless provides a movable eyelid for opening and closing the eye. The plastic 31 is secured in place between the rear wall 206 and the front wall 207 of the mask in any of the modes hereinbefore pointed out.

The head of Fig. 19, similarly to those disclosed in Figs. 21 and 22 comprises a two part base. The rear portion 210 of the base is left completely open at the front. The front portion 211 is pre-assembled with the mask 212 and the plastic material 31 either as shown, or in the pocket form heretofore described, after which the front portion 211 is secured to the rear base portion 210.

As has been previously indicated, the mask used in connection with any of the heads shown may be formed in a great number of different ways, some known in the art and others which will appear hereinafter. For example, the rubber mask may be formed of latex by pouring, dipping or spraying processes, or the mask may be formed by molding processes using rubber dam, or sheets, or unvulcanized dry rubber with or without the use of heat and/or pressure, or by any of the well-known methods of making soft rubber articles.

The face mask of Fig. 24 is integrally formed with the base coating and integrally joined thereto at the point 225. Suitable plastic 31 is inserted between the face portion and the head coating, and the face portion cemented to the head coating to form the finished head shown in Fig. 24, in which the base is coated inside and out with a layer of rubber and a double wall is provided in the mask or face portion.

It will be understood that the rubber latex mentioned is well known in the art and may be a compounded aqueous dispersion of rubber or any other rubber latex properly compounded and self-vulcanizing on drying or adapted to be cured at elevated temperatures.

The latex may be in highly concentrated form, if desired, containing a large percentage of rubber and therefore quick setting, or may be made to contain any percentage of rubber found convenient. Suitable vulcanizing and ageing ingredients, accelerators and/or fillers may be mixed with the latex in a manner known in the art and, therefore, which need not be further described. It will be understood, however, that to eliminate the separate operations of coloring the face of a figure as heretofore found necessary, coloring ingredients are preferably mixed with the latex, or that if the rubber used is other than in the form of latex, it may be masticated with pigments so as to give the finished article the desired flesh or skin color.

Where the cheeks are to be flushed with red and the lips colored red or the features similarly enlivened with natural colors, the parts are colored after the mask has been preformed. A variety of methods of coloring are known in the art but I have found that the following method may be successful. The surface of the rubber mask may be degenerated with a rubber solvent, immediately after which coloring ingredients may be applied with a finger or a brush, the mask then being allowed to dry completely.

Suitable water colors or rubber paint or any coloring ingredient may, however, be painted on the form, mold or die itself, at points corresponding to the cheeks, lips, eyebrows, etc. When the rubber is molded by any well known process, as when rubber latex is poured into the mold and on to the form, or when the form is dipped into latex, or when rubber is pressed into the mold, the coloring matter adheres to the coagulated latex or otherwise molded face, tending to form an integral part with said face at the points mentioned.

Another method is to apply coloring material to the rubber mask while the mask is preformed but still moist. Water colors are preferable here for the reason that water tends to mix easily with latex and becomes part of the rubber. Another method is to dip the form into transparent latex to form a thin film, then to paint the back of the film at the points corresponding to cheeks, lips, eyebrows, etc. with the desired colors, then, to continue the dipping or pouring of latex on to the mold to complete the mask. This will sandwich the coloring material between the outer transparent film and the flesh colored mask.

The above description exemplifies the great variety of forms which my invention may take. In view of the ramifications of my invention, it has been found difficult to describe all the various possible combinations and forms thereof. I desire to be understood, therefore, that certain parts shown assembled with other parts may be differently assembled, and different parts of my invention combined to form various combinations suggested herein but difficult of illustration because of their number.

I desire it also to be understood that my invention has a wide range of application, as has been hereinbefore indicated, including not only doll heads but the heads of any body, animate or inanimate, as well as to body parts other than heads.

While I have shown and described certain specific forms which my invention may take, I have made it clear that I do not intend to limit myself thereto but desire to claim my invention as broadly as may be permitted by the state of the prior art and the scope of the appended claims.

I claim:

1. A flexible part for a figure comprising a soft rubber container and a sufficient quantity of a doughy plastic in the container to overcome the tendency of the container to assume a relaxed position, said plastic comprising a gum in the nature of chicle and an inert filler.

2. In a head, a substantially rigid base member, a rubber member provided with preformed facial features, doughy non-resilient plastic material between said members, an eye on one of said members, and a movable eyelid forming part of the rubber member and adapted to be moved manually to deform said material and to open and close the eye.

3. In a head, a deformable rubber face mask provided with preformed, deformable, facial features, including rubber enclosed spaced pockets having non-resilient doughy material therein, a rigid base, and cement securing the peripheral portion of the mask to the base.

4. In a doll, a head comprising a rubber face provided with preformed features, a doughy non-resilient plastic forming part of the features and permitting change thereof, a hollow rubber body, and doughy non-resilient plastic within the body to permit the body parts to be set in various desired positions, said plastic being deformable under pressure and retaining its deformation after removal of the pressure.

5. In an inanimate figure, a head comprising a yieldable elastic face portion, flesh-like features on said portion including plastic doughy non-resilient material, a flesh-like body separate from the head and including a rubber cover and doughy non-resilient material arranged within the cover, and means for movably securing the head to the separate body.

6. A body for an inanimate figure comprising a rubber container portion, joints including solid doughy plastic non-resilient material at those points of said portion corresponding to the joints of a corresponding animate figure, the walls of said portion being thinned at predetermined points to insure bending of the joints at said points where bending stress is put upon said joints.

7. In a body for an inanimate figure, a hollow rubber container, the walls of said container being made of varying thicknesses, the thicknesses being least at predetermined points to insure bending of said walls at said points, and doughy plastic non-resilient material in the container and adjacent the thinned portions of said walls.

8. In the head of an inanimate figure, a substantially rigid base, a facial feature on and integral with said base, a rubber face mask carried by the base, doughy plastic non-resilient material between the cover and the base, and a movable rubber feature integral with the face mask and arranged outwardly of the feature on the base and adapted to be moved directly by the fingers of the user whereby the feature of the base is exposable on the movement of the corresponding feature of the mask.

9. In a doll, a hollow rubber body, integral transverse stiffening ribs projecting from the interior surface of said body, and a longitudinal stiffening rib on said surface.

10. In a doll, a hollow rubber body and stiffening ribs on the interior surface of said body.

11. A movable limb joint for a figure comprising an outer tubular rubber casing, a mass of non-resilient but solid dough-like material of pasty consistency in said casing and a pair of spaced end walls in said casing confining said material therebetween.

12. In a doll, a preformed rubber member provided with spaced and closed rubber pockets, and a limp, doughy plastic material inserted into and sealed within each of the pockets.

13. In a face mask for a doll or the like, a preformed rubber outer cover, a mass of limp, doughy plastic distributed on the inner face of the cover, and a rubber layer covering the inner face of the mass and joined to the cover.

14. In a face mask for a doll or the like, a flexible and elastic outer member preformed with features thereon, a second flexible and elastic member joined to the inner face of the first member at predetermined points, and plastic material between the members whereby the features may be manipulated by the manipulation of parts of the outer member.

15. In a head, a rubber outer member, a rubber inner member joined at predetermined points to the outer member, and plastic material arranged between the members and held thereby.

16. In an article of the character described, a rubber pocket and doughy plastic material enclosed in the pocket.

17. A moldable part of an object comprising a mass of amorphous plastic of such resiliency as to gradually assume its original form after deformation therefrom and after a predeterminable time interval, and a stretchable preformed rubber covering enclosing the mass and imparting said original form to the mass, said covering being thin and also tending to assume its original shape aided thereto by the plastic after distortion from said shape.

18. In an article of the character described, a rubber pocket and doughy plastic material enclosed in the pocket, said material having such comparatively slight resiliency as to tend to urge the pocket to assume gradually an original predetermined form thereof aided by the pocket a predetermined time after deformation of the pocket from said form.

19. In a head, a substantially rigid base member, a rubber member provided with preformed facial features, an eye on one of said members, and a movable eyelid forming part of the rubber member and adapted to be moved manually over the eye to open and close the eye.

20. In a head, a rubber member provided with preformed facial features and having an opening therein, an eye arranged at the opening, and a movable eyelid forming part of said member and manually stretchable over the eye to open and close the eye.

21. A flexible part for a figure comprising a soft thin rubber cover and a doughy plastic inside said cover of such resiliency as to urge the container to assume gradually its original form after deformation from said form.

EMANUEL JACOBSON.